US006615306B1

(12) United States Patent
Ajanovic

(10) Patent No.: US 6,615,306 B1
(45) Date of Patent: *Sep. 2, 2003

(54) METHOD AND APPARATUS FOR REDUCING FLOW CONTROL AND MINIMIZING INTERFACE ACQUISITION LATENCY IN A HUB INTERFACE

(75) Inventor: Jasmin Ajanovic, Portland, OR (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/433,913

(22) Filed: Nov. 3, 1999

(51) Int. Cl.[7] ............................................... G06F 13/00
(52) U.S. Cl. ........................ 710/305; 710/107; 710/112; 710/5; 710/27; 710/36
(58) Field of Search .......................... 710/5–7, 27–40, 710/107–112, 305–317

(56) References Cited

U.S. PATENT DOCUMENTS

| | | | |
|---|---|---|---|
| 5,634,034 A | | 5/1997 | Foster |
| 5,761,454 A | * | 6/1998 | Adusumilli et al. ........ 395/306 |
| 5,764,932 A | | 6/1998 | Gochman et al. |
| 6,067,628 A | * | 5/2000 | Krithivas et al. ........... 713/200 |
| 6,098,134 A | | 8/2000 | Michels et al. |
| 6,145,039 A | * | 11/2000 | Ajanovic et al. ........... 710/105 |
| 6,170,025 B1 | | 1/2001 | Drottar et al. |
| 6,216,183 B1 | * | 4/2001 | Rawlins ...................... 710/100 |
| 6,237,055 B1 | * | 5/2001 | Trieu et al. ................. 710/113 |
| 6,247,086 B1 | * | 6/2001 | Allingham ................... 710/128 |
| 6,253,270 B1 | * | 6/2001 | Ajanovic et al. ........... 710/107 |
| 6,256,697 B1 | * | 7/2001 | Ajonovic et al. ........... 710/113 |
| 6,272,563 B1 | * | 8/2001 | Ajanovic et al. ............. 710/29 |
| 6,347,351 B1 | * | 2/2002 | Osborne et al. ............ 710/119 |
| 6,356,968 B1 | | 3/2002 | Kishon |
| 6,374,317 B1 | * | 4/2002 | Ajanovic et al. ........... 710/105 |
| 6,446,154 B1 | * | 9/2002 | Ajanovic et al. ........... 710/305 |

* cited by examiner

Primary Examiner—Christopher B. Shin
(74) Attorney, Agent, or Firm—Blakely, Sokoloff, Taylor & Zafman LLP

(57) ABSTRACT

A method and apparatus for reducing flow control and minimizing interface acquisition latency in a hub interface is a method of transferring data between a control hub coupled to a hub interface which is coupled to an input-output hub including the following: Transferring the data in packets. Prioritizing isochronous transfers over asynchronous transfers. Limiting asynchronous transfers to 32 bytes per packet when an agent requests the hub interface, and limiting asynchronous transfers to 64 bytes per packet when no requests for the hub interface are recognized.

19 Claims, 11 Drawing Sheets

METHOD AND APPARATUS FOR REDUCING FLOW CONTROL AND MINIMIZING INTERFACE ACQUISITION LATENCY IN A HUB INTERFACE

BACKGROUND OF THE INVENTION

1. Field of the Invention

This invention relates generally to the field of computer systems and more specifically to optimizing flow of information between components in computer systems.

2. Description of the Related Art

Prior art systems often use a configuration of components as illustrated in FIG. 1. CPU 101 (a Central Processor or Processor) is coupled through a Processor Bus 102 to a component referred to as a Host Bridge 105, and thereby coupled to the rest of the system. Host Bridge 105 is coupled to Memory 103, the main memory of the system, and Host Bridge 105 is also coupled to I/O Bridge 107 (Input/Output Bridge). I/O Bridge 107 couples to Keyboard 109, Mouse 111, and Disk Drive 110, and may couple to other components in a bus or point-to-point fashion. Through these couplings, CPU 101 is coupled to each component in the system, and may read or write information to each of the devices (within the capabilities of those devices).

Further extending the complexity of the system, PCI Bus 125 (Peripheral Component Interconnect Bus based on the Peripheral Component Interconnect Bus Specification Revision 2.1 or 2.2 from the Portland PCI Working Group as published by Intel Corporation) may be involved in the coupling of Host Bridge 105 to I/O Bridge 107, and may thereby couple PCI Agents 120, other devices on the PCI Bus 125. Thus, through Host Bridge 105, CPU 101 may communicate with PCI Agents 120. While it is advantageous to make PCI Agents 120 available to the system, incorporating the PCI Bus 125 into a coupling or connection between two components further complicates the physical devices and layout, and the protocols for communication over that coupling.

SUMMARY OF THE INVENTION

A method and apparatus for reducing flow control and minimizing interface acquisition latency in a hub interface is a method of transferring data between a control hub coupled to a hub interface which is coupled to an input-output hub including the following: Transferring the data in packets. Prioritizing isochronous transfers over asynchronous transfers. Limiting asynchronous transfers to 32 bytes per packet when an agent requests the hub interface, and limiting asynchronous transfers to 64 bytes per packet when no requests for the hub interface are recognized.

BRIEF DESCRIPTION OF THE DRAWINGS

The present invention is illustrated by way of example and not limitation in the accompanying figures.

DETAILED DESCRIPTION

A method and apparatus for reducing flow control and minimizing interface acquisition latency in a hub interface is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

The functioning and implementation of a hub interface is well described later in this application. However, a summary of that description in conjunction with an alternate embodiment will be useful as well.

Figure 1:
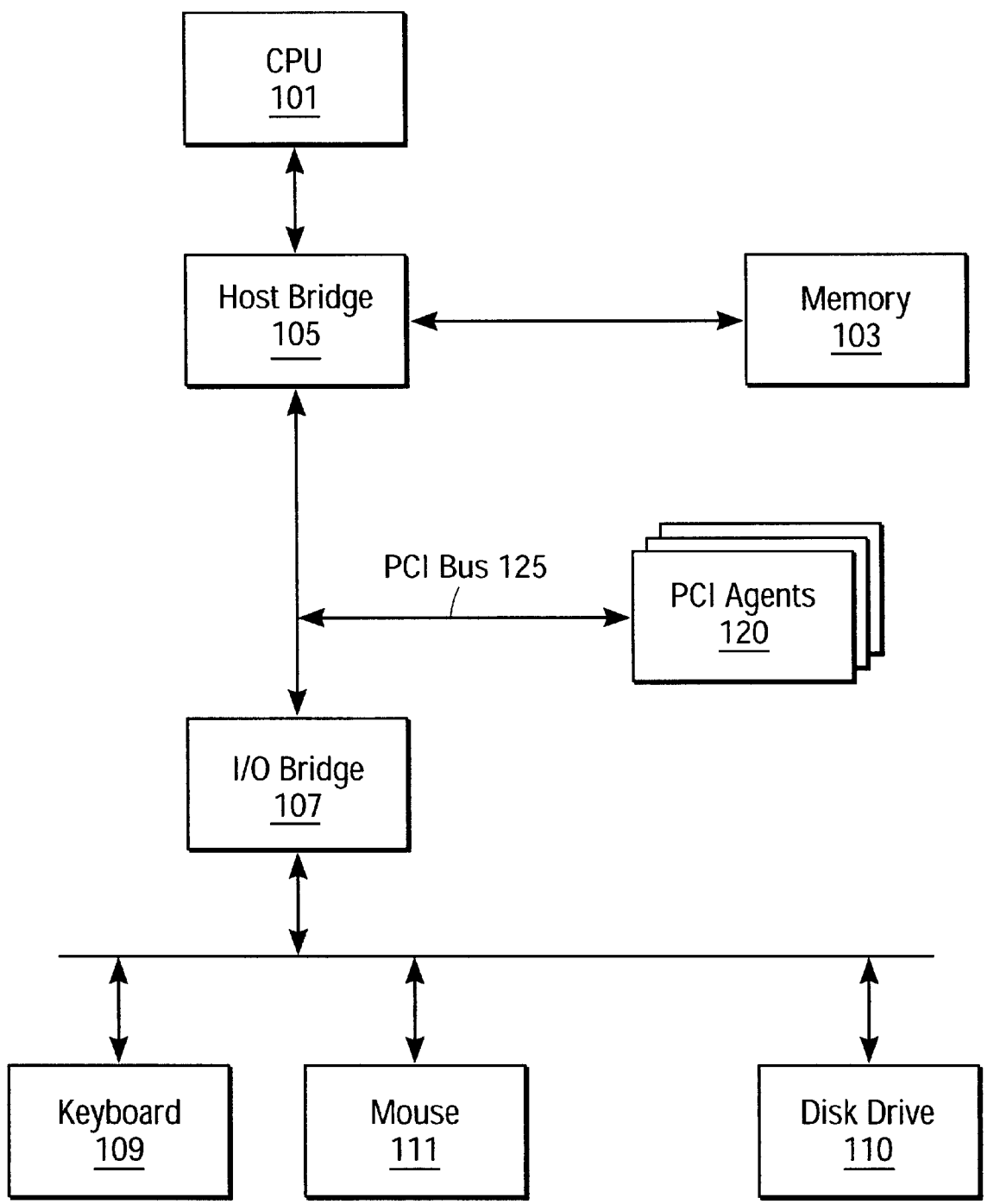
FIG. 1 illustrates a prior art computer system.
Figure 2:
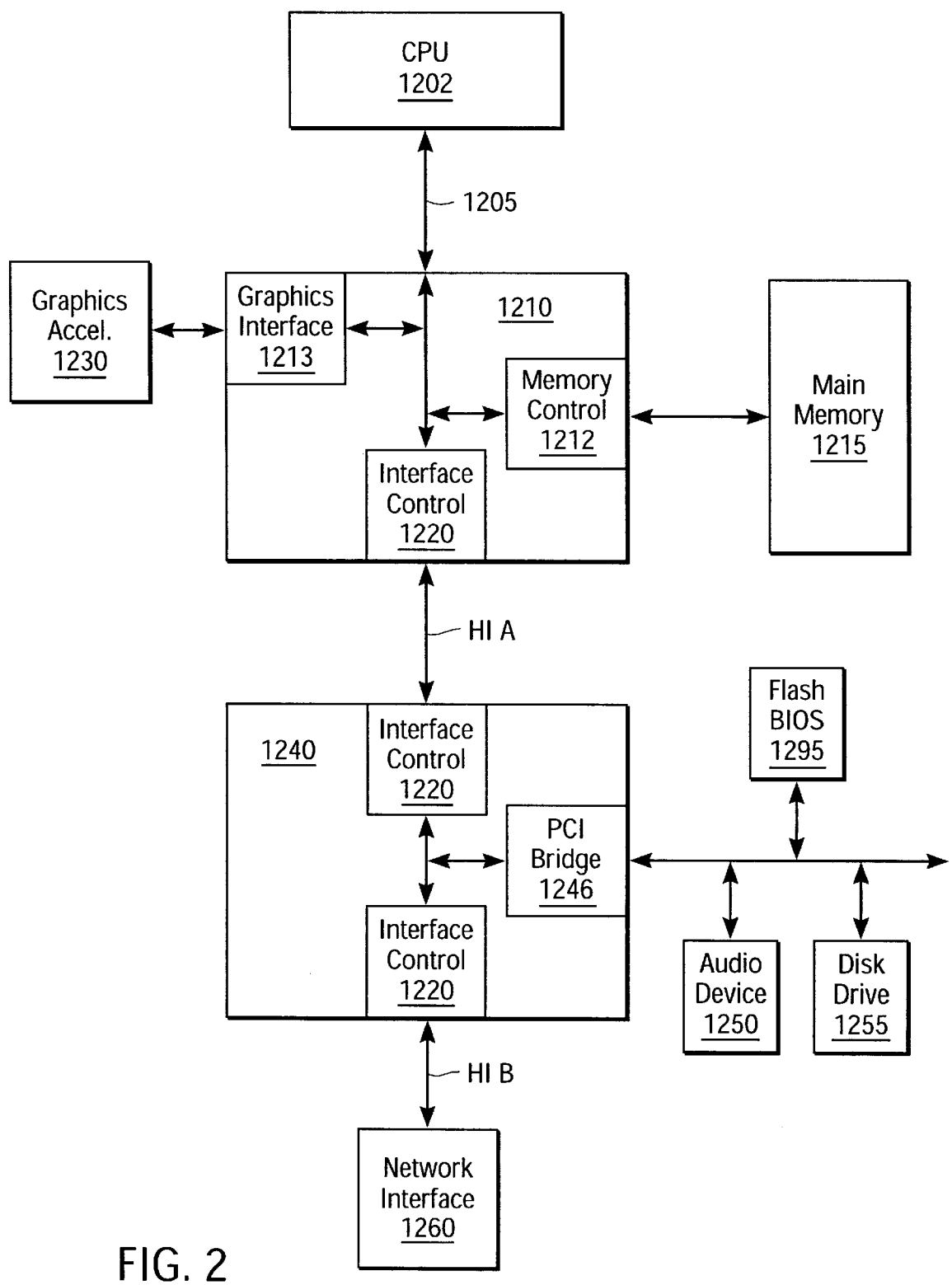
FIG. 2 illustrates one embodiment of a computer system.

FIG. 2 illustrates one embodiment of a system utilizing a hub interface. CPU 1202 is coupled through processor bus 1205 (the processor bus is also often referrred to as the CPU bus or the host bus) to Memory Control Hub (MCH) 1210. Processor bus 1205 may also be referred to as Host Bus 1205. MCH 1210 utilizes Memory Control 1212 to couple to Main Memory 1215, Graphics Interface 1213 to couple to Graphics Accelerator 1230, and Interface Control 1220 to couple to the rest of the system via hub interface (HI) A. ICH 1240 (Input/Output Control Hub) couples to hub interface A through Interface Control 1220. Internally, ICH 1240 utilizes PCI Bridge 1246 to couple to PCI Agents such as Audio Device 1250 and Disk Drive 1255 via a PCI Bus. ICH 1240 also utilizes another Interface Control 1220 block to couple to hub interface (HI) B and thereby to couple to Network Interface 1260. Furthermore, ICH 1240 couples to FLASH BIOS 1295, a basic input output system which, in one embodiment, is stored in a FLASH EPROM memory.

In one embodiment, the CPU 1202 and the MCH 1210 are combined into one component or integrated circuit. In an alternative embodiment, CPU 1202 and Graphics Accelerator 1230 are combined into one component or integrated circuit. In yet another alternative embodiment, MCH 1210 and Graphics Accelerator 1230 are combined into one component or integrated circuit. In still another alternative embodiment, CPU 1202, MCH 1210 and Graphics Accelerator 1230 are combined into one component or integrated circuit. It will be appreciated that the practice of the invention need not be limited to a specific configuration combining or separating the functions represented by the functional blocks of, for example, FIG. 2. It will be appreciated that the components illustrated in FIG. 2 may be separate components or may be integrated on a single integrated circuit. Similarly, components in, for example, FIG. 3 may be integrated or discrete and still be within the spirit and scope of the invention.

In one embodiment, the hub interface is a narrow-width, high throughput communications link using packets of information, each packet encoding a request or completion. The packets include various fields and are broken into a series of data words transmitted on a set of wires, such that most of the control information for the hub interface is embedded in the packets, reducing the need for additional control signals as a sideband separate from the data. Information may be said to travel either downstream, away from the processor or CPU, or upstream. Components linked to the bus are referred to as agents, and are often referred to as a downstream or upstream agent depending on the point of reference of the description. For instance, relative to the MCH 1210, the Disk Drive 1255 is a downstream agent in FIG. 2.

Packets on the hub interface, in one embodiment, embody requests or completions. Requests may contain an address to which the request is directed and may also include control information and data as appropriate. For example, a request that an agent write data to a storage location would include the data to be written, and may also include a request for completion. Special cycles are also a form of request, and are generally used for system management functions (special cycles are described in more detail below). Also, reads and writes may be performed without addresses in some circumstances. Completions include information indicating whether and how the task was completed, such as completion status codes (including indications of potential error conditions or successful completion of a transaction), and may also include data. Thus, a completion corresponding to a read request may include the data read along with an indication of whether any errors occurred in the reading. In the case of a completion corresponding to a write request, an indication of any possible errors or of successful completion is included, but no data is included.

In one embodiment, the hub interface may also be used to transmit special cycle packets which embody control information. Such special cycles may be transmitted between the transmission of packets for read or write data, and may alter the flow of information or the performance of components involved in the hub interface. Special cycles may be packets including only a header, or may include an address or data as appropriate. In some instances, special cycles may result in a completion, too.

In one embodiment, CPU 1202 initiates a transaction, either read or write, on processor bus 1205. The transaction includes an address and may include data if it is a write. The address indicates where the transaction is targeted. If the transaction is targeted at Main Memory 1215, MCH 1210 carries it out and returns the data or results to CPU 1202. Similarly, if the transaction is targeted at Graphics Accelerator 1230, the MCH performs the transaction and returns the data or results to CPU 1202. If the target is further down the hub interface hierarchy, the MCH 1210 transforms the transaction into a request packet and passes it down the hub interface HI A to the ICH 1240. The ICH 1240 interprets the packet and determines the target of the request, and then appropriately signals that target for either a read or a write as necessary. If a completion is requested in the case of a write, or for any read, the ICH 1240 passes a packet back up the hub interface HI A, with the appropriate data and/or completion status codes.

Further, in one embodiment, special cycles may come from the MCH 1210 to the ICH 1240 in response to transactions on the processor bus 1205, which may cause the ICH 1240 to adjust its performance or activity, including but not limited to signaling errors to devices connected to the ICH 1240 or acting as if an error signal was received from a device connected to the ICH 1240.

Figure 3:
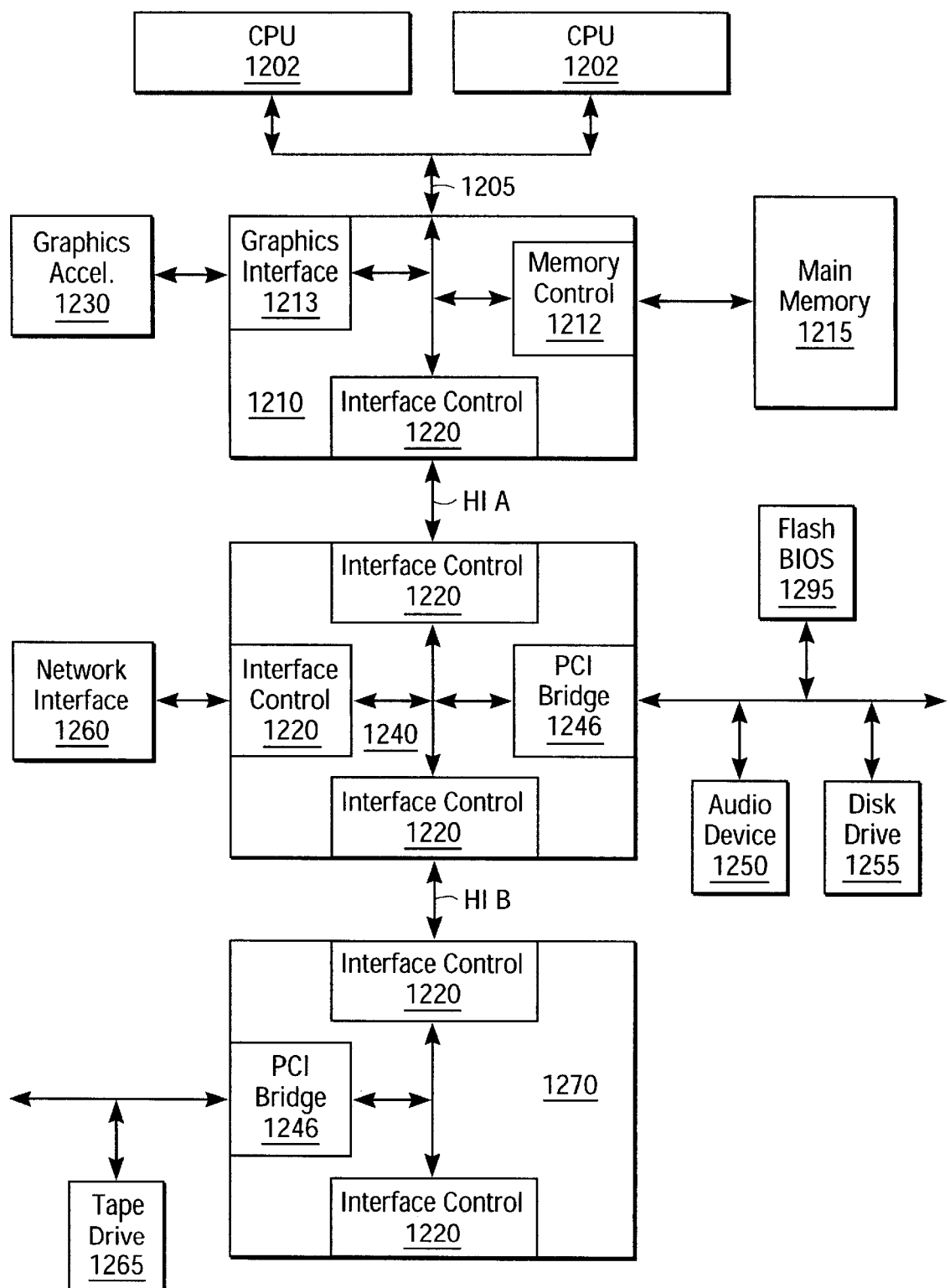
FIG. 3 illustrates an alternative embodiment of a computer system.

The hub interface allows for much flexibility in a system, as illustrated in FIG. 3. In this illustration, two CPUs 1202 are coupled through processor bus 1205 to MCH 1210. As in FIG. 2, MCH 1210 couples to Main Memory 1215 and Graphics Accelerator 1230. ICH 1240 couples through PCI Bridge 1246 and a PCI bus to Audio Device 1250, Disk Drive 1255, and FLASH BIOS 1295. ICH 1240 also couples to Network Interface 1260. However, ICH 1240 is coupled directly to Secondary Hub 1270 through hub interface B (HI B). Note that this coupling occurs between two Interface Control 1220 components, one in ICH 1240 and one in Secondary Hub 1270. Secondary Hub 1270, in this embodiment, includes another PCI Bridge 1246, which couples to Tape Drive 1265 through a PCI bus.

In one embodiment, a first CPU 1202 may initiate a read of the Tape Drive 1265 on processor bus 1205. This read is passed as a packet by the MCH 1210 to the ICH 1240. The ICH 1240 determines from the address in the packet that the packet is targeted to the downstream hub interface where the Tape Drive 1265 may be found (the ICH 1240 does not determine specifically where the read is bound, only where to pass it next based on address information contained within the request packet), and therefore passes the packet on along hub interface HI B to Secondary Hub 1270. Secondary Hub 1270 receives the packet and determines that it targets the Tape Drive 1265, and then initiates the read of Tape Drive 1265. Upon receiving the data or error signal from the Tape Drive 1265, the Secondary Hub 1270 packages the results in a completion packet which it sends upstream along hub interface HI B to the ICH 1240. The ICH 1240 determines that the packet is a completion bound for the upstream hub interface HI A (where first CPU 1205 may be reached), and passes the packet upstream along the hub interface HI A to the MCH 1210. The MCH 1210 determines also that the packet is a completion bound for the processor bus 1205. The MCH 1210 issues completion of the read sequence on the processor bus 1205 and provides the read data that was received in a hub interface packet sent by Tape Drive 1265.

Some assumptions may be made about the performance of components in a hub interface. First, most I/O data movement (movement of data to and from an input or output device) is performed by the bus master, such as ICH 1240 for example. Additionally, most, if not all, I/O traffic from the bus master is targeting main memory. Furthermore, hub interface special cycles, Configuration and I/O transactions are relatively rare events. Special cycles are the cycles used for system management functions, typically involving transmission of a packet which only contains a header with special codes in the header, such as error codes for instance.

In a hub interface, transactions may be divided into two types, asynchronous and isochronous. Isochronous traffic takes precedence in one embodiment over asynchronous traffic, and often involves a series of reads or writes to adjacent locations in memory. Fortunately, it may be assumed that the source of ISOC (isochronous) write traffic naturally spaces requests in time and thus prevents or minimizes hub interface flow control on ISOC writes. For Example, a USB or an IEEE-1394 host adapter may produce ISOC traffic. (IEEE-1394 refers to the IEEE 1394-1995 Specification adopted in 1995 and available from the Institute of Electrical and Electronics Engineers and its follow-on specifications; USB refers to the Universal Serial Bus Specification version 1.0 adopted in 1996 available from the USB Implementers' Forum and its follow-on specifications.)

Adding to these assumptions, certain design constraints on the components may be made to further minimize flow control. For instance, Downstream I/O devices, such as ICH 1240 for example, may be constrained to only request a READ when the device has storage available to accept the return data from the READ request. Such storage is typically some form of FIFO or buffer internal to the device. Additionally, Upstream devices, in particular a controlling hub, such as the MCH 1210 for example, may be designed to include command and data queue storage space suitable to accommodate multiple outstanding READ requests during initiation (command) and completion (data) phases of read transactions. Another design constraint that may be imposed is that data portion of Asynchronous memory write packets is limited to 32 or 64 bytes per packet for an 8-bit hub interface and 64 or 128 bytes for a 16 bit hub interface depending on the speed of operations of the hub interface, refering to source synchronous data transfers of 4× for first generation hub interfaces and 8× for second generation hub interfaces as illustrated by the following matrix:

| HI | 8b | 16b |
|---|---|---|
| HI1(4x) | 32B | 64B |
| HI2(8x) | 64B | 128B |

Size of the transfers is limited to the amount of data that can be transferred within certain reasonably small numbers of common clock periods. For example for HI1–8 bit (hub interface generation 1, 8 bit) there are 4 source synchronous data phases within one common clock period and therefore if the limit is 8 common clocks in terms of time that corresponds to a packet size limit calculated as 8×(4×8b)=32 Bytes. It will be appreciated that a different number of common clocks may be used to arrive at a different packet size, and that number may be influenced by various design factors. Other designs may therefore have other optimum lengths for packets, without departing from the broader spirit and scope of the invention. Other factors such as system cache line size can be used to decide on the optimal number. Current systems have caches with 32 B or 64 B line size and future ones may have a line size of 128 B.

To further reduce interface acquisition latency and increase bandwidth available for ISOC transactions, one may further assume that while read requests may specify up to 256 bytes of data, return data will be broken down into 32 byte (or 64 byte for 16 bit interfaces) packets. Additionally, ISOC transfers should never be timed out on the hub interface, the arbitration time-slice mechanism does not apply, and ISOC traffic takes as much bandwidth as it needs, allowing asynchronous traffic the residue. As such, the following design constraints may be introduced.

In the presence of a request from another agent on the interface, the agent that acquires the interface and performs asynchronous transactions must break those transactions into 32 byte (or 64 byte for 16 bit interfaces) packets. In the presence of requests from other agents, the agent that owns the interface and performs multiple back-to-back asynchronous transactions must release the tenure of the interface as soon as practical, which may typically be the next packet. If another agent is not requesting the interface, asynchronous packets are limited to 64 bytes (128 bytes for 16 bit hub interface), and back-to-back transactions during the interface tenure are allowed. These constraints may be summarized as limiting packet sizes to either 32 or 64 bytes depending on whether another agent is requesting the interface, and surrendering the interface to another agent as soon as a request is recognized and the current transaction is completed.

Figure 4:
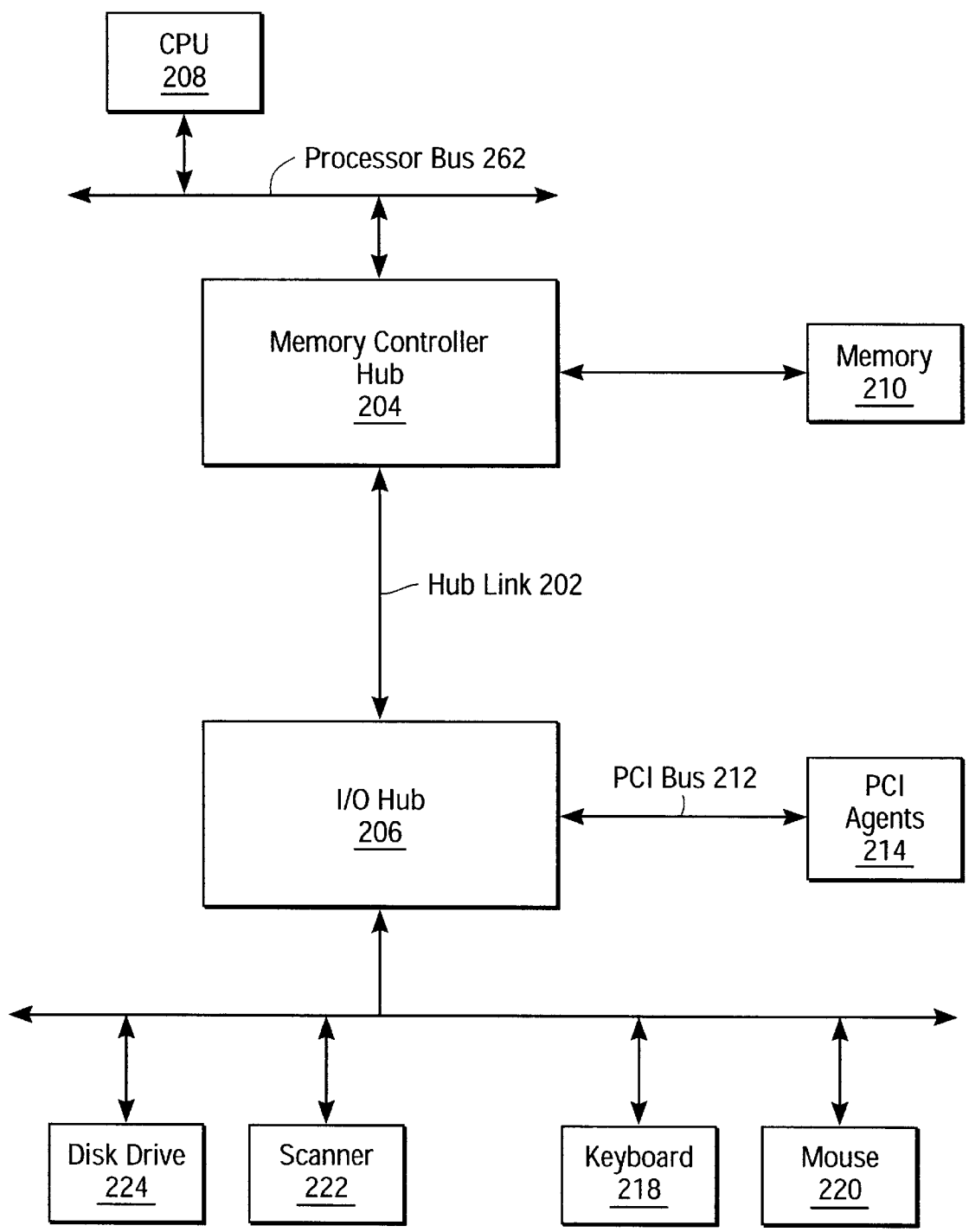
FIG. 4 is a block diagram of one embodiment of a computer system implementing the improved interface between computer components.

A more detailed description of a hub interface follows. It will be appreciated that this description illustrates some of the alternatives for implementing the hub interface. As illustrated in FIG. 4, one embodiment of the hub interface provides individual components with a point-to-point interface. In alternative embodiments, however, the hub interface may provide an interface between three or more components.

More specifically, FIG. 4 illustrates one embodiment of the hub interface 204 used to interconnect two separate components (i.e., hub agents) within a chipset. The hub agents provide a central connection between two or more separate buses and/or other types of communication lines.

For example, as further shown in FIG. 4, the chipset includes a memory controller hub 204 (MCH) and an input/output (IO) hub 206. The memory controller hub 204, as shown in FIG. 4, provides an interconnection/hub between one or more Central Processing Units 208 (CPU) and the system memory 210. The CPU 208 is coupled to a Processor Bus 262 which is couple to the MCH 204.

The I/O hub 206 provides an interconnection between various peripheral components within the system (e.g. a keyboard 218, disk drive 224, scanner 222 and/or mouse 220.) Moreover, the external busses and their agents (e.g., PCI bus 212 and PCI agents 214), interconnect indirectly with the memory 210 and CPU 208 via the hub interface 202, by interconnecting with the I/O hub 206, rather than interconnecting directly with the memory controller hub 204.

By using the hub interface to interconnect the memory controller hub 204 and the I/O hub 206, improved access is provided between I/O components and the CPU/memory subsystem (e.g., increased bandwidth, protocol independence, and lower latency.) In addition, the hub interface may also improve the scalability of a computer system (e.g., upgrading from a base desktop platform to high-end desktop platforms or workstation platform) by providing a backbone for I/O building blocks.

To provide the improved interface, the hub interface includes one or more unique features. In one embodiment, transactions are transferred across the hub interface using a packet based split-transaction protocol. For example, a Request Packet is used to start a transaction and a separate Completion Packet may subsequently be used to terminate a transaction, if necessary.

Figure 5:
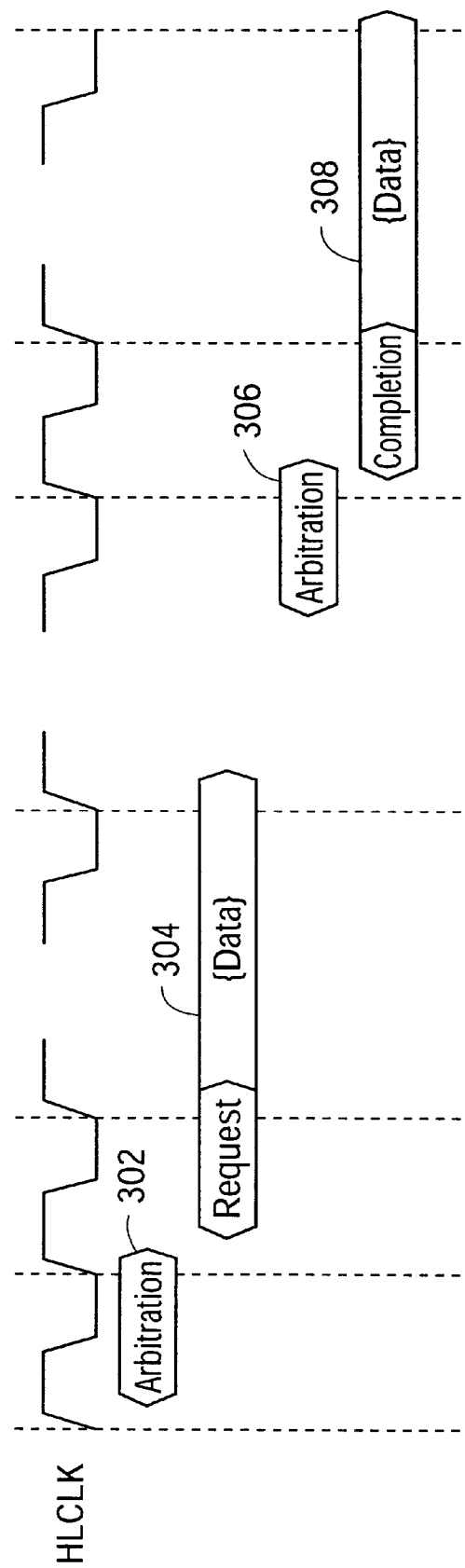
FIG. 5 is a timing diagram illustrating a split transaction implemented by one embodiment of an interface.

FIG. 5 illustrates an example of a split transaction across the hub interface. As illustrated in FIG. 5, a hub agent initially obtains ownership of the hub interface via arbitration 302. Following the arbitration, there is a request phase 304. If necessary (e.g., in the case of returning data for a read transaction), a completion phase 308 will follow the request phase. Prior to the completion phase, however, the responding hub agent, will first arbitrate 306 for ownership of the hub interface.

In between the time of transmitting a request packet and a corresponding completion packet across the hub interface, separate unrelated packets may be transmitted across the hub interface in accordance with predetermined order rules, as discussed below in more detail. For example in the case of a read request from a peripheral to memory, providing the requested data may take multiple clock cycles to have the data ready to be returned in a completion packet. During the time it takes to obtain the requested data, separate unrelated completion and/or request packets waiting in a queue/pipe of the memory controller hub 204, may be transmitted to the I/O hub 206.

Furthermore, as shown in FIG. 5, each request or completion is transmitted as a packet across the interface. For write type transactions, data is associated with the request. For read type transactions, there will be data associated with the completion. In some cases, there will be more than one completion for a request for the case where the completion packet is disconnected, effectively splitting it into multiple completion packets.

In addition, in one embodiment, the hub interface uses transaction descriptors for routing of hub interface traffic as well as identifying the attributes of a transaction. For instance, the descriptors may be used to define a transaction as isochronous or asynchronous, which, as a result, may then be handled in accordance with a predefined protocol.

Furthermore, in one embodiment, the bandwidth of the interface is increased in part by transmitting the data packets via a source synchronous clock mode. Moreover, in one embodiment, the hub interface provides the increased bandwidth despite using a narrow connection (e.g., less pins/pads).

In alternative embodiments, however, a hub interface may be implemented with less than all of the unique features as discussed above, without departing from the scope of the invention. Moreover, the hub interface could also be used to interconnect bridges and and/or other components within or external to a chipset, without departing from the scope of the present invention.

Transaction, Protocol and Physical Layers

For greater clarity, the hub interface is described in three parts: a transaction layer; a protocol layer; and a physical layer. The distinctions between layers, however, is to be regarded in an illustrative rather than a restrictive sense, and is therefore does not to imply a particular preferred embodiment.

Transaction Layer

In one embodiment of the hub interface, the transaction layer supports the routing of separate transactions transmitted across the hub interface (which may consist of one or more packets.) For example, in one embodiment, the transaction layer of the hub interface generates transaction descriptors, which are included in the requests and data packets. The transaction descriptors may be used to support arbitration between queues within a hub agent (e.g., MCH), and/or to facilitate routing of requests and data packets through the hub interface.

For instance, in one embodiment, the transaction descriptors support routing of completion packets back to the request-initiating agent based on initially supplied (within a request packet) routing information. The transaction descriptors also help to reduce or possibly minimize packet-decoding logic within the hub agents.

In alternative embodiments, the transaction descriptors also provide the ability to distinguish the handling of requests based on their respective transaction attributes. For instance, the transaction attributes identified in the transaction descriptors may identify operations as Isochronous (i.e., operations that move fixed amounts of data on a regular basis; e.g., video or audio real time operations.) As a result, the operations, as identified by the transaction attributes, may be handled in accordance with a corresponding predetermined routing protocol in order to support a specific type of operation (e.g., isochronous.)

In one embodiment, the transaction descriptors include two fields: a routing field and an attribute field. In alternative embodiments, more or less fields may be used to provide one or more of the functions of the transaction descriptors, without departing from the scope of the invention.

In one embodiment, the routing field is a six-bit field used for packet routing, as shown below in Table 1. The size of the routing field, as well as the attribute field, may vary within the scope of the invention.

TABLE 1

Routing Field of Transaction Descriptor

| 5 | 4 | 3 | 2 | 1 | 0 |
|---|---|---|---|---|---|
| Hub ID | | | Pipe ID | | |

As shown in Table 1, three bits of the routing field are used for the Hub ID which identifies the hub agent that initiated the transaction. In alternative embodiments, to provide a hub interface hierarchy exceeding 8, additional bits could be used in the routing field.

Figure 6:
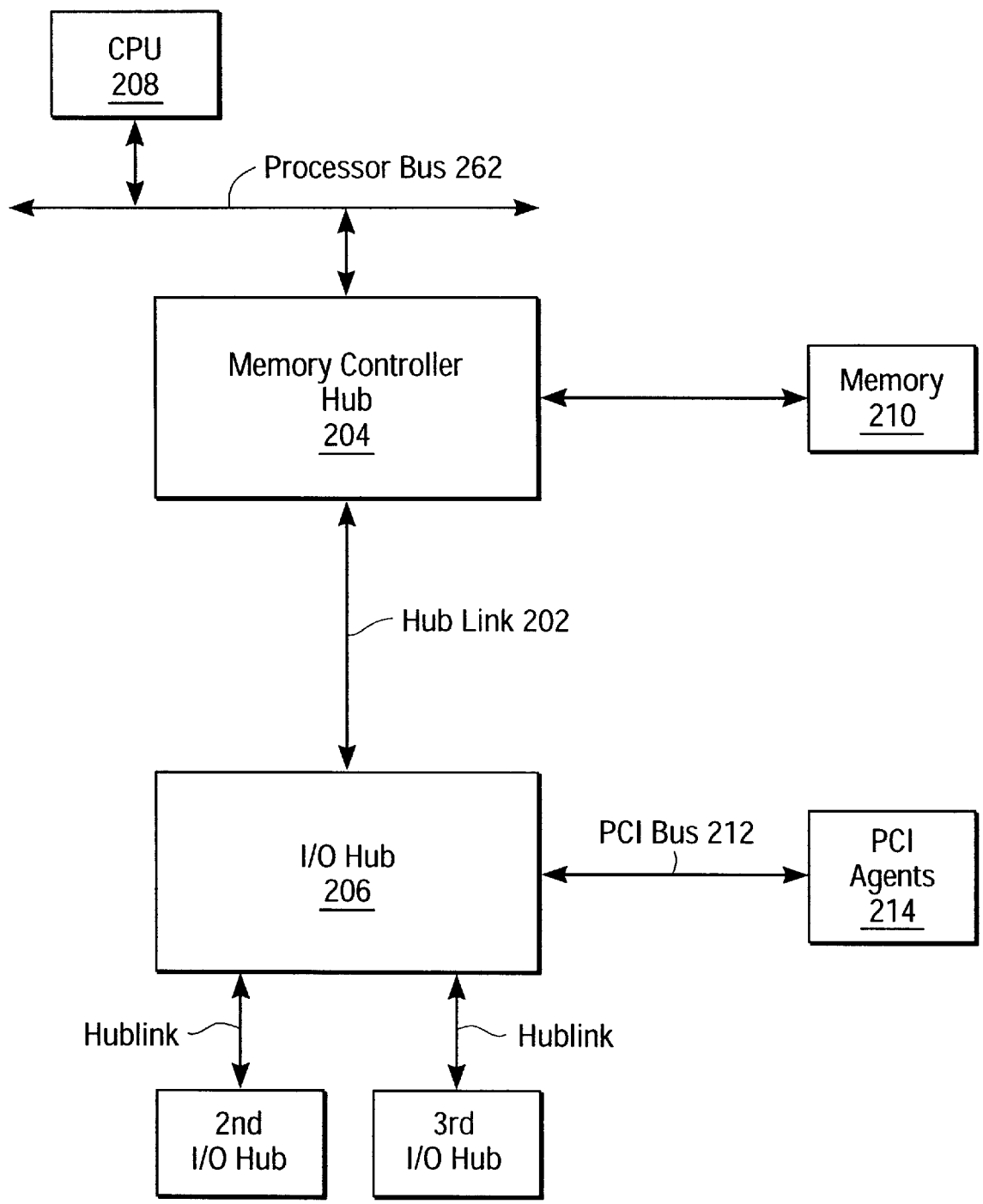
FIG. 6 is a block diagram of one embodiment of a computer system implementing a hierarchy of multiple improved interfaces between computer components.

For example, there may exist multiple hub interface hierarchies in a system, in which case the agent at the top of the hierarchies should be capable of routing completions back to the base of the hierarchy. In this context, "hierarchy" consists of multiple connected hub interface segments starting from a hub interface "root" agent (e.g., a Memory Control Hub.) For instance, FIG. 4 illustrates a system having only one hub interface hierarchy. FIG. 6, however, illustrates an example of system based on two hub interface hierarchies. In embodiments implementing only one hub interface hierarchy, a default value of "000" may be used in the Hub ID field.

The remaining three bits of the routing field may be used to identify internal pipes/queues within a hub interface agent. For example the I/O Control Hub may support internal USB (Universal Serial Bus) host controller traffic and Bus Mastering ID (BM-ID) traffic via separate "pipes." (USB refers to the Universal Serial Bus Specification version 1.0 adopted in 1996 available from the USB Implementers' Forum and its follow-on specifications.) As such, the Pipe ID may be used communicate to the servicing agent (e.g., MCH) that traffic initiated by different "pipes" have different attributes, and may be handled in accordance with a predetermined protocol. If a hub interface agent does not implement separate internal pipes, it may use a default value of "000" in the Pipe ID field.

In an alternative embodiment, the transaction descriptors further include an attribute field. In one embodiment, the attribute field is a three-bit value, which specifies how a transaction is to be handled when a target hub interface agent receives it. In some cases, the attribute field helps a system support demanding application workload, which relies on the movement, and processing of data with specific requirements or other differentiating characteristics.

For example, the attribute field may support the isochronous movement of data between devices, as used by a few recently developed external busses such as IEEE 1394-compliant and USB-compliant busses. (IEEE-1394 refers to the IEEE 1394-1995 Specification adopted in 1995 and available from the Institute of Electrical and Electronics Engineers and its follow-on specifications.) Such data movement requirements need to be maintained as data flows through the hub interface between I/O devices and the CPU/memory subsystem.

In alternative embodiments, additional transaction attributes may include the ability to differentiate between "snooped" traffic where cache coherency is enforced by hardware (i.e., chipset) and "non-snooped" traffic that relies on software mechanisms to ensure data coherency in the system. Moreover, another possible attribute would be an "explicitly prefetchable" hint, to support a form of read caching and allow for more efficient use of the main memory bandwidth.

Ordering Rules

The transaction descriptors can also be used to support ordering rules between transactions transmitted across the hub interface. For example, in one embodiment, transactions with identical transaction descriptors are executed in strong order (i.e., first come—first serve.)

Transactions having the same routing field but different attribute fields, however, may be reordered with respect to each other. For example, in one embodiment, isochronous transactions do not need to be strongly ordered with respect to asynchronous transactions.

In addition, in one embodiment of the hub interface, data transmissions are permitted to make progress over requests, either in the same direction or the opposite direction. Read completions flowing in one direction are allowed to pass read requests flowing in the same direction. And, write requests are allowed to pass read requests flowing in the same direction.

In alternative embodiments, however, the ordering rules for transactions travelling across the hub interface, may vary within the scope of the invention. For example, in one embodiment, the hub interface implements the ordering rules provided in Peripheral Component Interconnect (PCI) (Revision 2.2) to determine the flow of traffic across the hub interface in opposite directions.

Protocol Layer

In one embodiment, the hub interface uses a packet-based protocol with two types of packets: request and completion. A request packet is used for each hub interface transaction. Completion packets are used where required, for example, to return read data, or to acknowledge completion of certain types of write transactions (e.g., I/O writes and memory writes with requested completion). Completion packets are associated with their corresponding request packets by transaction descriptors and ordering, as previously discussed in the section on the Transaction Layer.

In addition, in one embodiment, the hub interface uses an arbitration protocol that is symmetric and distributed. For example, each hub agent drives a request signal, which is observed by the other agent attached to the same interface. No grant signal is used, and agents determine ownership of the interface independently.

Moreover, in one embodiment, no explicit framing signal is used. There is an implied relationship between the arbitration event that gives an agent ownership of the interface and the start of that agent's transmission. In alternative embodiment, framing signals could be used without departing from the scope of the invention.

The end of a packet transmission occurs when a hub interface agent that owns the interface (e.g., is in the process of transmitting data), releases its control of the interface by de-asserting a request signal. In addition, in one embodiment, flow control is also accomplished by using a STOP signal to retry or disconnect packets, as is described in more detail below.

Packet Definition

In one embodiment of the hub interface, data is transferred at a multiple rate (e.g., 1×, 4×, 8×) of the hub interface clock (HLCK), which in one embodiment is a common clock shared by the hub agents joined by the hub interface. The data is transmitted across a data signal path (PD) of the hub interface, which has an "interface width" of some power of two (e.g., 8, 16, 24, 32.) As a result, the hub interface may have varying data transfer granularities (i.e., transfer widths), depending upon the transfer rate and the width of the data signal path. For example, in the case of an eight-bit interface width in 4× mode, the transfer width is 32 bits per HLCK. As a result, by varying the transfer rate and/or the interface width of the data signal path, the transfer width (i.e., number of bytes transferred per HLCK) can be scaled.

In addition, in one embodiment, packets may be larger than the transfer widths. As a result, the packets are transmitted in multiple sections (i.e., packet widths.) In one embodiment, the packets are divided into packet widths the size of double words (32 bits).

In the case of a 32 bit transfer width, the bytes of a packet width are presented on the interface starting with the least significant byte (byte 0) and finishing with the most significant byte (byte 3), as shown below in Table 2. In the case of a 64 bit transfer width (e.g., a sixteen bit wide interface in 4× mode) the less significant double-word (packet width) is transferred on the lower bytes of the data signal (e.g., PD [0:7]) and the more significant double-word is transferred in parallel on the upper bytes of the data signal (e.g., PD [15:8]). The two examples are shown below in table 2.

TABLE 2

Byte Transmission Order for 8 and 16 Bit Interface Widths

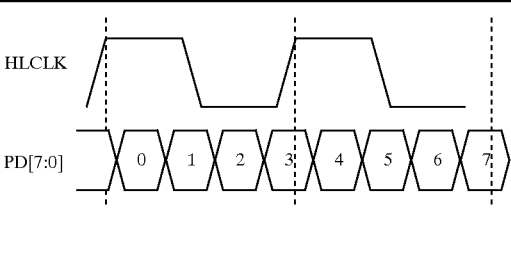

8 Bit Interface

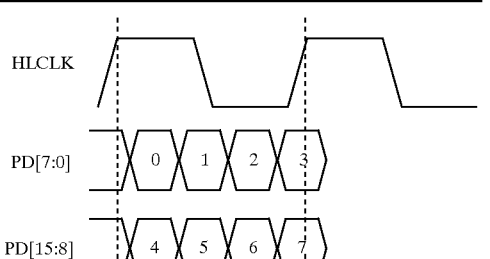

16 Bit Interface

The Protocol Layer of the hub interface is also responsible for framing the data. As such, the framing rules implemented by the hub interface define how to map one or more packet widths onto a set of transfer widths. To simplify the parsing of packets into packet widths, in one embodiment of the hub interface, the following three framing rules are implemented: a header section of a packet starts on the first byte of a transfer width; a data section of a packet (if present)

starts on the first byte of a transfer width; and a packet occupies an integral number of transfer widths.

Any available transfer widths not consumed by a packet may be filled with a bogus double word (DW) transmission, and will be ignored by the receiving hub agent. In alternative embodiments, more, less, and/or different framing rules may be used by the hub interface within the scope of the present invention.

Table 3 and Table 4 set forth below, illustrate examples of the framing rules given above for the case of a 64 bit transfer width.

In the examples shown in Tables 5 and 6, the base header is one double-word, with one additional double-word required for 32 bit addressing, and two additional double-words required for the 64 bit addressing mode. The fields of the headers, as shown in Tables 5 & 6 are described below the tables.

In alternative embodiments of the hub interface, the fields included in the header of the request packet may vary without departing from the scope of the invention. For example, the header may include additional field, less fields,

TABLE 3

Request using 32 Bit Addressing and Containing Three Double-words of Data

| 4th Byte Transmitted on PD[15:8] | 3rd Byte Transmitted on PD[15:8] | 2nd Byte Transmitted on PD[15:8] | First Byte Transmitted on PD[15:8] | 4th Byte Transmitted on PD[7:0] | 3rd Byte Transmitted on PD[7:0] | 2nd Byte Transmitted on PD[7:0] | First Byte Transmitted on PD[7:0] |
|---|---|---|---|---|---|---|---|
| Byte 7 | Byte 6 | Byte 5 | Byte 4 | Byte 3 | Byte 2 | Byte 1 | Byte 0 |
| Address (32b) |||| Request Header ||||
| Second DW of Data |||| First DW of Data ||||
| (Dummy DW) |||| Third DW of Data ||||

TABLE 4

Request using 64 Bit Addressing and Containing Three Double-words of Data

| 4th Byte Transmitted on PD[15:8] | 3rd Byte Transmitted on PD[15:8] | 2nd Byte Transmitted on PD[15:8] | First Byte Transmitted on PD[15:8] | 4th Byte Transmitted on PD[7:0] | 3rd Byte Transmitted on PD[7:0] | 2nd Byte Transmitted on PD[7:0] | First Byte Transmitted on PD[7:0] |
|---|---|---|---|---|---|---|---|
| Byte 7 | Byte 6 | Byte 5 | Byte 4 | Byte 3 | Byte 2 | Byte 1 | Byte 0 |
| Address (31:2) |||| Request Header ||||
| {Dummy DW} |||| Address (63:32) ||||
| Second DW of Data |||| First DW of Data ||||
| {Dummy DW} |||| Third DW of Data ||||

Request Packets

The packet header format for request packets, according to one embodiment, is shown below in Table 5 and Table 6.

or different fields in place of the fields shown below. Moreover, the encoding of the fields may also vary without departing from the scope of the invention.

TABLE 5

Request Packet Header Format for 32 bit Addressing

| Last Byte Transmitted ||||||||| | | | | | | | | | | | | | | First Byte Transmitted | | | | | | | |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| rq cp | r/ w | cr | af | lk | Transaction Desc. Routing Field ||||||| Reserved ||| TD Attr |||| Space |||| Data Length (DW) ||||| Last DW BE |||| 1$^{st}$ DW BE |||| Base |
| Addr[31:2] |||||||||||||||||||||||||||||| R | ea ct | Address |

TABLE 6

Request Packet Header Format for 64 bit Addressing

| Last Byte Transmitted | | | | | | | | | | | | | | | | | | | | | | | | | | | | First Byte Transmitted | | | | |
|---|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 | |
| rq/cp | r/w | cr | af | lk | Transaction Desc. Routing Field | | | Reserved | | | | | | | | TD Attr | | | | Space | | | | Data Length (DW) | | | | Last DW BE | | 1st DW BE | | Base |
| Addr[31:2] | | | | | | | | | | | | | | | | | | | | | | | | | | | | | R | ea | | 32 bit component |
| Addr[63:32] | | | | | | | | | | | | | | | | | | | | | | | | | | | | | | | | 64 bit component |

| | |
|---|---|
| Transaction Descriptor | The Transaction Descriptor Routing and Attribute fields as previously described. |
| rq/cp | Request packets are identified with a '0' and completion packets with a '1' in this location. |
| cr | Completion required ('1') or no completion required ('0'). |
| r/w | Read ('0') or Write ('1'). This field indicates if data will be included with a completion (read) or a request (write). |
| Address Format (af) | The addressing format is either Implied ('0') or 32/64 bit ('1'). |
| Lock (lk) | Flag to indicate that the request is part of a locked sequence. Requests and completions in a locked sequence will have this bit set. Hub agents, which do not comprehend lock, ignore this flag and will fill this field with '0'. |
| Data Length | The data length is given in double-words, encoded such that the number of double-words represented is one plus this number. Thus, "000000" represents one double-word. |
| Space | This field selects the destination space type for the request. In one embodiment, possible destination spaces include Memory ("00"), and IO ("01"). |
| 1st DW BE | Byte enables for the first double-word of any read or write request to Memory or IO. Byte enables are active low. If there is only one double-word for a request, this byte enable field is used. In one embodiment, it is illegal to issue a memory or IO read or write request with no bytes enabled. |
| Last DW BE | Byte enables for the last double-word of any read or write request. Byte enables are active low. If there is only one double-word for a request, this field must be inactive ("1111"). Byte enables may be discontiguous (e.g.: "0101"). This field is never used with special cycles since it overlaps the "Special Cycle Encoding" field. |
| Addr[31:2] | The 32 bit address is generated as it would be on PCI for same type of cycle. This double-word is included for the 32 and 64 bit addressing modes (but not for the implied addressing mode). |
| Extended Address (ea) | Indicates 32 bit addressing ('0') or 64 bit addressing ('1'). |
| Config Type (ct) | For configuration cycles only, this bit is used to indicate Type 0 ('0') or Type 1 ('1') configuration cycle type. Because configuration cycles will always be performed with 32 bit addressing, this bit is overlapped with the "Extended Address" bit. |
| Addr[63:32] | Upper address bits for 64 bit addressing mode. This double-word is included for the 64 bit addressing mode. |

Completion Packets

The header format for a completion packet, according to one embodiment, is shown below in Table 7. In one embodiment, the header is one double-word. The fields of the headers, as shown in Table 8 are described following the table.

In alternative embodiments of the hub interface, however, the fields included in the header for a completion packet may vary without departing from the scope of the invention. For example, the header may include additional field, less fields, or different fields in place of the fields as described and shown below. Moreover, the encoding of the fields may also vary without departing from the scope of the invention.

TABLE 7

Completion Packet Header Format

| Last Byte Transmitted | | | | | | | | First Byte Transmitted |
|---|---|---|---|---|---|---|---|---|
| 31 30 29 28 27 26 25 24 | 23 22 21 20 19 18 17 16 | 15 14 13 12 11 10 9 8 | 7 6 5 4 3 2 1 0 |

| rq/cp | r/w | Reserved | lk | Transaction Desc. Routing Field | Reserved | TD Attr | Rsvd | Data Length (DW) | Completion Status |
|---|---|---|---|---|---|---|---|---|---|

| | |
|---|---|
| Transaction Descriptor | The Transaction Descriptor Routing and Attribute fields as previously discussed in the Transaction section. |
| rq/cp | Completion packets are identified with a '1' in this location. |
| r/w | Read ('0') or Write ('1'). This field indicates if data will be included with a completion (read) or a request (write). |
| Lock (lk) | Flag to indicate that the completion is part of a locked sequence. Requests and completions in a locked sequence will have this bit set. Agents, which do not comprehend lock, ignore this flag and will fill this field with '0'. |
| Data Length | The data length is given in double-words, encoded such that the number of double-words represented is one plus this number. Thus, "000000" represents one double-word. |
| Completion Status | Indicates completion status using predetermined. |
| Reserved | All reserved bits are set to '0'. |

In one embodiment of hub interface, completions for memory reads may provide less than the full amount of data requested so long as the entire request is eventually completed. Likewise, completions for memory writes may indicate that less than the entire request has been completed. This might be done to satisfy a particular hub interface latency requirement for a particular platform.

In addition, for a request that requires completion, the initiator, in one embodiment, retains information about the request, which may be stored in a buffer of the initiating hub agent. For example, this information may include the transaction descriptor, the size of the packet, lock status, routing information, etc. Furthermore, when receiving the completion(s), the initiator matches the completion(s) with the corresponding request. In the case of multiple completions, the initiator accumulates a count of the data completed for the original request until the original request is fully completed.

Interface Arbitration and Packet Framing

In one embodiment of the hub interface, when the interface is idle, the assertion of a request from either hub agent connected to the interface, is considered an arbitration event. The first agent to request wins ownership of the interface. If agents request ownership simultaneously when the hub interface is idle, the least recently serviced hub agent wins. In one embodiment, all hub agents track the least recently serviced status (e.g., via a status flag of an internal register.) In alternative embodiment, alternative arbitration routines may be used within the scope of the present invention.

Once a hub agent acquires the ownership of the interface, it will continue to own the interface until it completes its transaction, or until an allocated time bandwidth expires. For example, in one embodiment, a timeslice counter is provided in each hub agent to control bandwidth allocation and to limit an agent's interface ownership tenure. The time allotted to a hub agent (i.e., timeslice value) may be different or the same for hub interface agents attached to the same interface. The timeslice counter is started upon acquiring ownership of interface and counts hub interface base clock periods.

In one embodiment, each hub agent is responsible for managing its own timeslice allocation. As such, in one embodiment, a timeslice value may be programmed via a hub interface command register for each interface in each hub agent.

Figure 7:
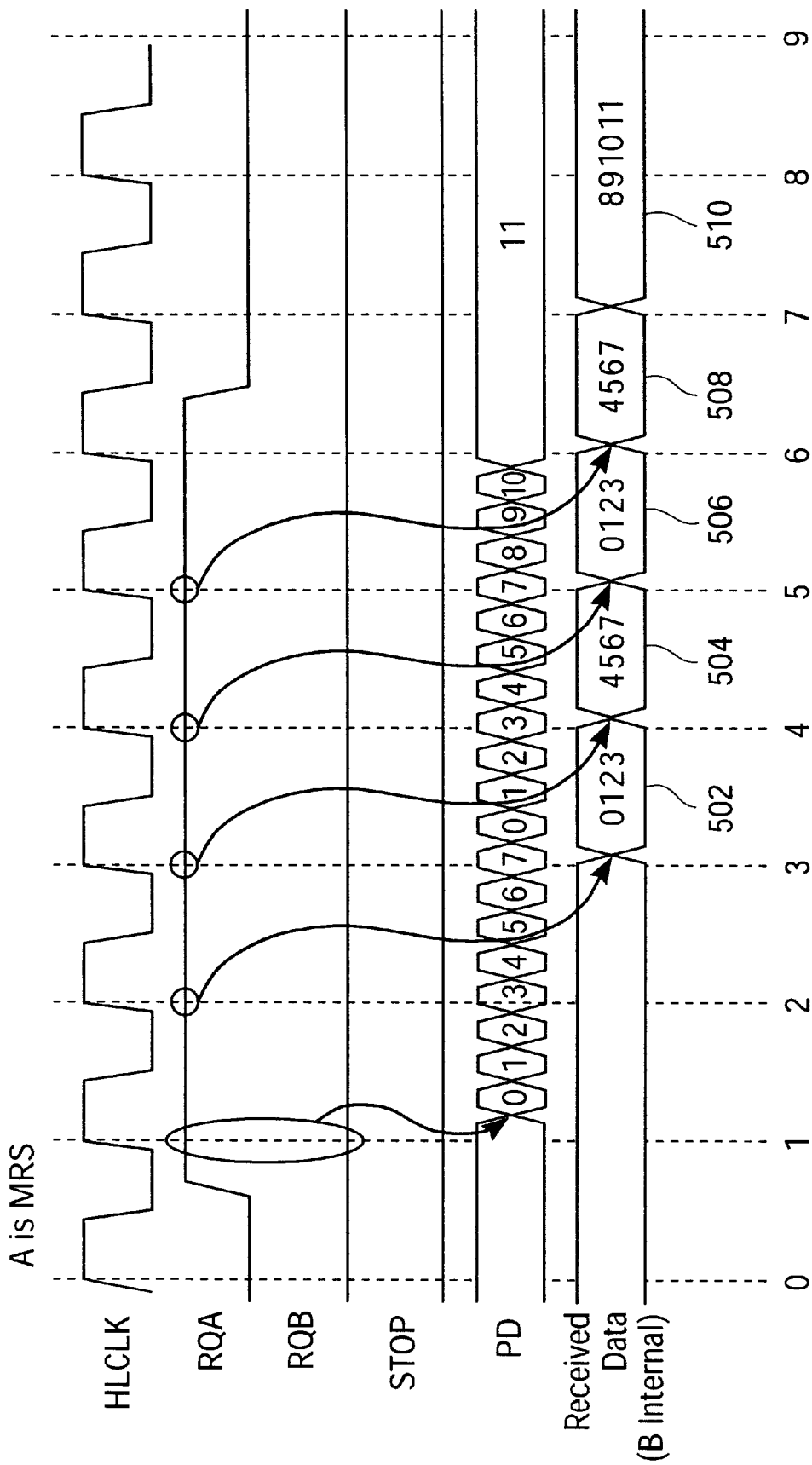
FIG. 7 is a timing diagram illustrating arbitration and transmission of data packets, according to one embodiment.

FIG. 7 illustrates an example of arbitration for the hub interface between hub agent A and agent B and the transfer of two packets. The example illustrates arbitration out of an idle interface state, with the interface then returning to idle. Moreover, in the example illustrated, the interface is using a 4x data transfer mode with eight bit data signal (PD) path. Agent A, in the example illustrated in FIG. 7, is the most recently serviced (MRS) agent. As a result, Agent A asserts its external request signal (RQA) and samples the state of the Agent B's request signal (RQB) on clock edge 1 (which is shown to be inactive) before starting packet transmission off the same edge.

In one embodiment, there is a two clock delay before the transmitted data (i.e., data from Agent A) is available internally in the receiver (i.e., Agent B), starting from clock edge 3. The first packet consists of two double-words 502 and 504 and requires two base clocks to transmit in the 4x mode. The second packet is three double-words 506, 508, and 510, and so requires three base clocks in the 4x mode.

Flow Control

In one embodiment, packets may be retried or disconnected by a receiving agent due to lack of request queue space, data buffer space, or for other reasons. In one embodiment, Flow control is accomplished using a STOP signal.

Figure 8:
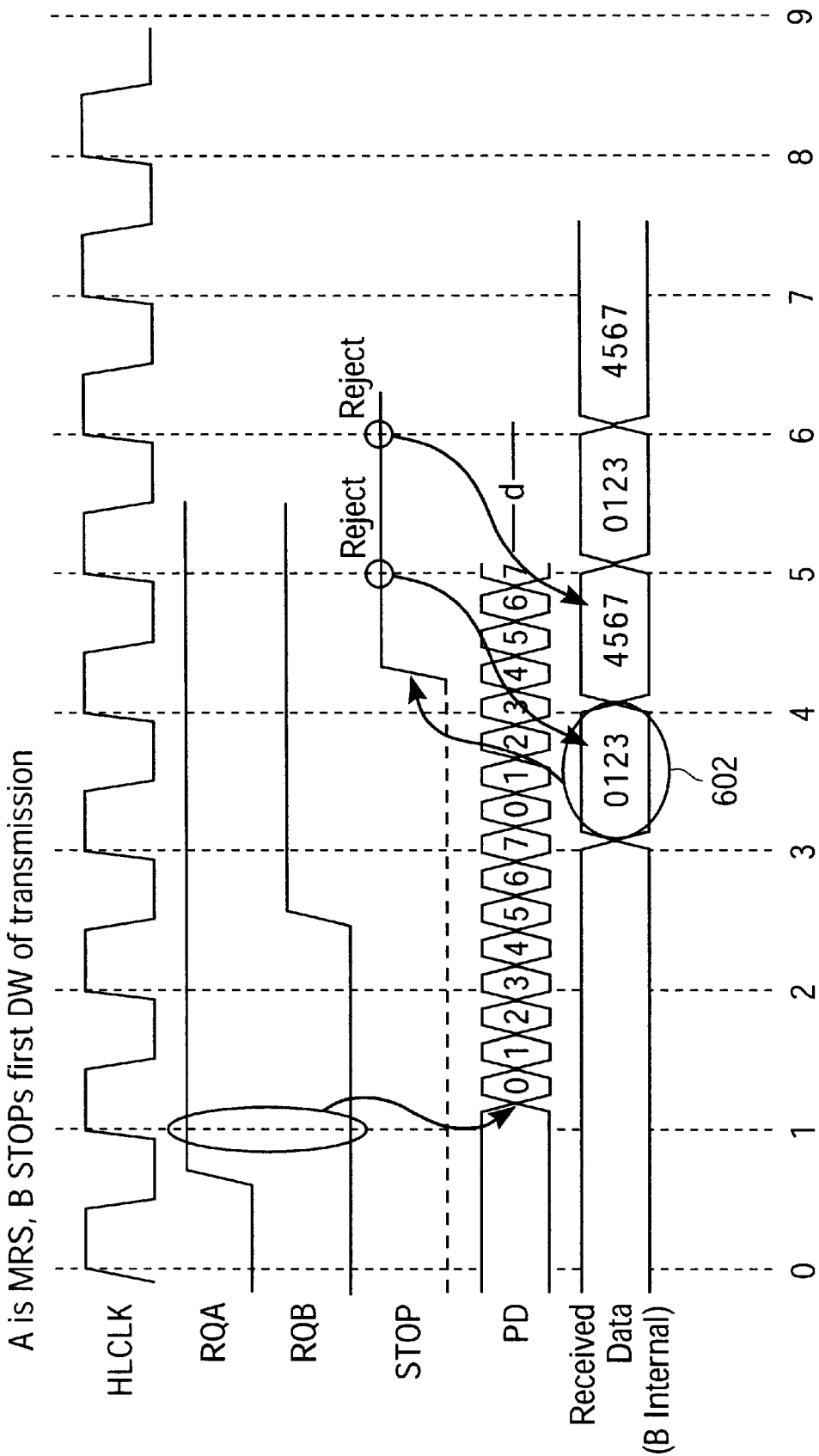
FIG. 8 is a timing diagram illustrating flow control of data packets, according to one embodiment.

FIG. 8 illustrates an example of the use of STOP signal. As illustrated, Agent A asserts its external request signal (RQA) and samples the state of the Agent B's request signal (RQB) on clock edge 1 (which is shown to be inactive) before starting packet transmission off the same edge (e.g., clock edge 1.)

Following a two clock delay, the data transmitted from Agent A is available internally in the receiver at Agent B, starting from clock edge 3. In one embodiment, following receipt of data transmitted from Agent A, is the first opportunity for Agent B to enact flow control by asserting the STOP signal, as illustrated in FIG. 8, at clock edge 4.

In addition, when ownership of PD signal changes from one hub agent to another, ownership of the STOP signal will be also be exchanged following a predetermined number of clocks. Moreover, in one embodiment, the STOP signal is sampled on base clocks, which correspond to the final transfer of a packet width. For example, in a 4x mode (using an eight bit wide PD signal), the STOP signal is sampled each base clock. However, for a 1× mode, the STOP signal is sampled each fourth clock (with the beginning of a transaction being used as a reference point).

Figure 9:
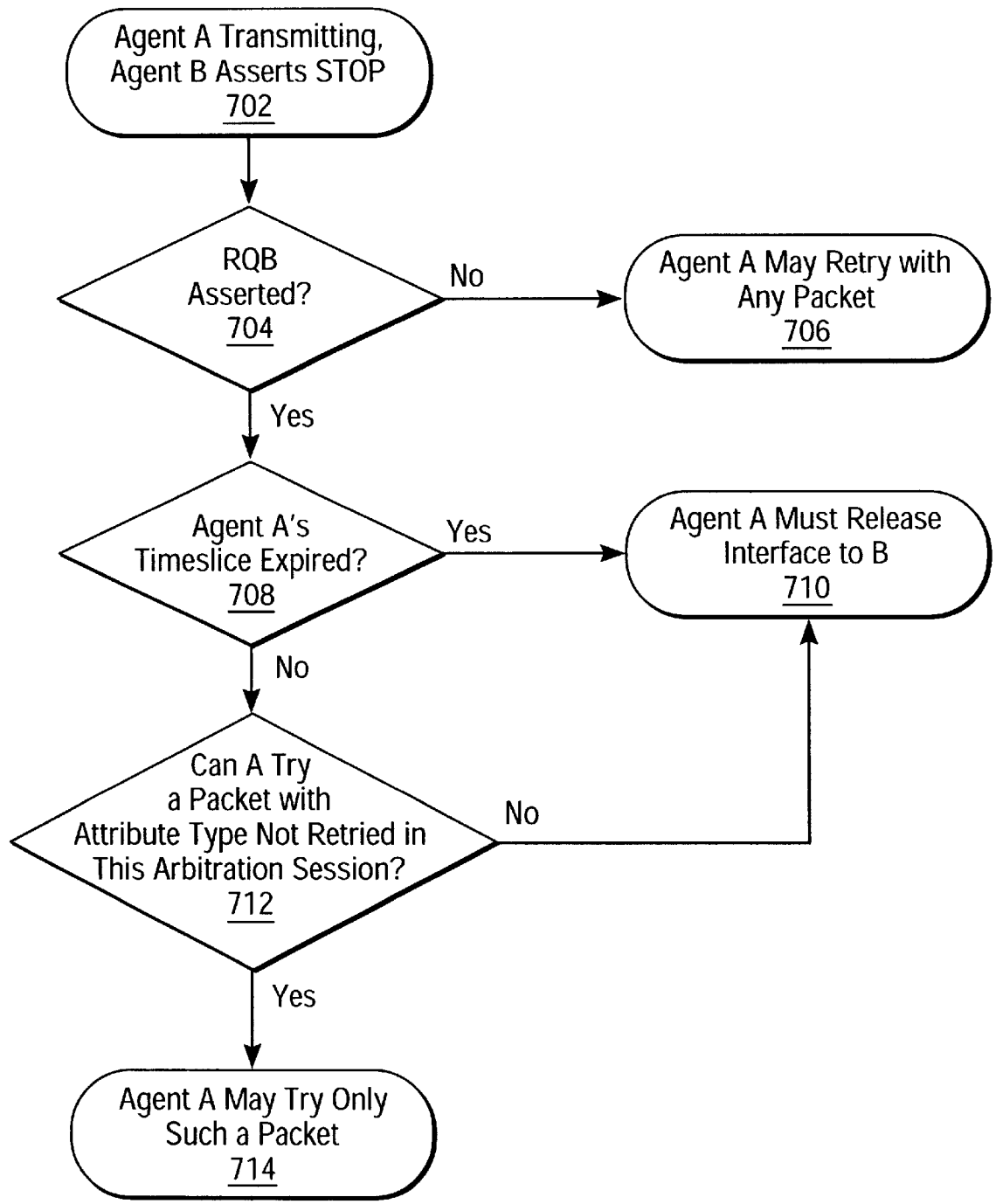
FIG. 9 illustrates a flow diagram describing the steps of responding to flow control operations according to one embodiment.

Following the reception of a STOP signal, the hub agent that receives the STOP signal determines whether it may retry sending additional packets. FIG. 9 is a flow diagram describing the steps performed by a hub agent in determining whether it may retry sending a packet following receipt of a STOP signal, according to one embodiment.

In step 702, a hub agent that is currently transmitting packets receives a STOP signal. In response, in step 704 the hub agent that receives the STOP signal determines if the other agent (which activated the STOP signal) is requesting ownership of the interface, by sampling the other hub agents request signal (e.g., RQB.)

If the recipient of the STOP signal determines that the agent which sent the STOP signal is not requesting ownership of the interface, in step 706 the current owner of the interface may attempt to transmit a packet following recovery from the STOP. On the other hand, if it is determined that the agent which activated the STOP signal is requesting ownership, in step 708, the current owner determines if its timeslice has expired.

If the timeslice for the current owner of the interface has expired, in step 710, the current owner releases ownership. If the timeslice for the current owner has not expired, the current owner may transmit a packet with an attribute that is different from the interrupted packet. More specifically, in step 712, the current owner determines if it has a packet with a attribute type that is different from any packets that have been retried in the present arbitration session (i.e., the period of the current owner's tenure), which needs to be transmitted.

If the current owner does have a packet with a different attribute, in step 714 the current owner may attempt to transmit the packet. Otherwise, the current owner release ownership of the interface.

Physical Interface

In one embodiment, the hub interface implements a physical interface that operates at a base frequency of either 66 MHz or 100 MHz. Other frequencies may also be used. In addition, in one embodiment, the physical interface uses a source synchronous (SS) data transfer technique which can be quad-clocked to transfer data at 4× of the base hub interface clock. As a result, in an embodiment having an 8-bit data interface (e.g., PD) operating at a base frequency of 66 MHz or 100 MHz, a bandwidth of 266 megabytes per second (MB/s) or 400 MB/s may be achieved, respectively.

Furthermore, in one embodiment, the hub interface supports a voltage operation of 1.8V, and is based on complementary metal-oxide semiconductor process (CMOS) signaling. In an alternative embodiments, however, the interface may operate at alternative frequencies and/or alternative sized data interfaces to provide varying bandwidths, and support alternative operating voltages, based on alternative signal processing, without departing from the scope of the invention.

External Signals Definition

Figure 10:
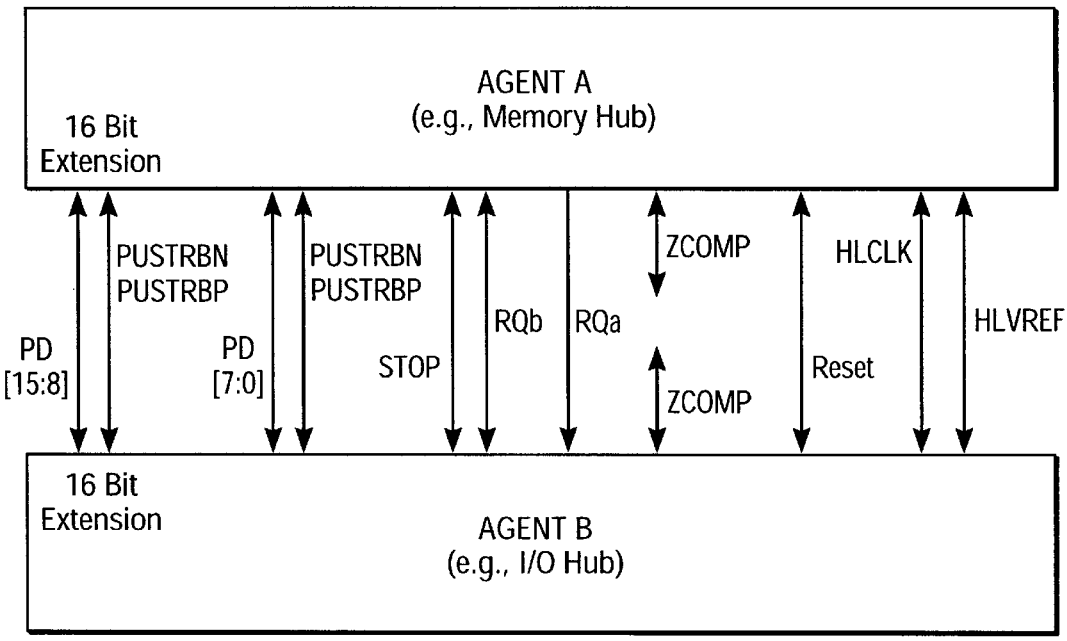
FIG. 10 illustrates the physical signal interface according to one embodiment.

FIG. 10 illustrates the physical signal interface of the hub interface between two hub agents, according to one embodiment. As shown in FIG. 10, the hub interface physical interface uses a bi-directional eight bit data bus (PD [7:0]) with a differential pair of source synchronous strobe signals (PSTRBN, PSTRBP) for data clocking. In an alternative embodiment, the interface can widened. For example, as shown in FIG. 10, an additional eight bit data bus (PD [15:8]) can also be used along with an additional pair of pair of source synchronous strobe signals (PUSTRBN, PUSTRBP.) Moreover, in an alternative embodiment, unidirectional data signals could be used.

In addition, one unidirectional arbitration signal connects each agent to the other (RQa, RQb), and a bi-directional STOP signal is used by the receiving agent to control data flow, as previously described. Additional interface signals include the system reset (Reset), common clock (HLCLK) and voltage reference signals (HLVREF). As well, signals for each hub agent (ZCOMP) to match its driver output impedance to the appropriate value to compensate for manufacturing and temperature variations, are also included.

The physical signals shown in the interface illustrated in FIG. 10 are further described below in Table 8. In alternative embodiments of the hub interface, the signals included in the physical interface may vary without departing from the scope of the invention. For example, the physical interface may include more, less or different signals varying from the signals shown in FIG. 10 and further described below in Table 8.

TABLE 8

Hub interface Signals for Eight Bit Agents

| Name | Bits (Pads) | Type | Clock Mode | Description |
| --- | --- | --- | --- | --- |
| PD[7:0] | 8 | ASTS[1] | SS[2] | Packet data pins. The data interface when idle, in one embodiment, is held by active sustainers at the last voltage value to which it was driven. |
| PSTRBP | 1 | ASTS | SS | Negative PD Interface Strobe (default voltage level = VSSHL) and Positive PD Interface Strobe (idle voltage level = VCCHL) together provide timing for 4X and 1X data transfer on the PD[7:0] interface. The agent that is providing data drives this signal. PSTRBN and PSTRBP should be sensed fully differentially at the receiver. |
| PSTRBN | 1 | ASTS | SS | Positive PD Interface Strobe, see PSTRBP description above. |
| RQa | 1 | I/O | CC[3] | Active-high request from agent A (output from A, input to B) to obtain ownership of the hub interface. RQa is asserted when agent A has data available to send, and is deasserted when either all of agent A's data has been sent or agent A determines that it should release the interface. Reset voltage value is VSSHL. |

TABLE 8-continued

Hub interface Signals for Eight Bit Agents

| Name | Bits (Pads) | Type | Clock Mode | Description |
|---|---|---|---|---|
| RQb | 1 | I/O | CC | Request from agent B (output from B, input to A). See above description of RQa. |
| STOP | 1 | ASTS | CC | Used for pipelined flow control to retry or disconnect packets. |
| HLCLK | 1 | I | N/A | hub interface base clock, in one embodiment, either 66 MHz or 100 MHz. This provides timing information for the common clock signals (described further below. |
| RESET# | 1 | I | CC | Active-low reset indication to hub interface agents.[4] |
| HLVREF | 1 | I | N/A | Voltage reference (VCCHL/2) for differential inputs. In one embodiment, the voltage is generated on the motherboard through a voltage divider. |
| HLZCOMP | 1 | I/O | N/A | Provides Impedance Compensation. |
| VCCHL | 4 | power | N/A | 1.8 V |
| VSSHL | 4 | ground | N/A | |
| Total: | 25 | | | |

[1]ASTS = Actively Sustained Tri-State.
[2]SS = Source Synchronous Mode Signal
[3]CC = Common Clock Mode Signal
[4]In one embodiment, Reset is a system-wide signal; it is an output from one component of the system and an input to the other component(s). Moreover, Reset is asynchronous with respect to HLCLK.

Common Clock Transfer Mode Operation

In one embodiment, many of the signals transmitted across the hub interface are transmitted in accordance with a common clock mode. More specifically, the timing of the signals that are transmitted via the common clock mode are referenced to a single clock (e.g., the hub interface clock.) In alternative embodiments, the signals may be tied to a system clock, exterior to the hub interface agents. Moreover, there may be more than one hub interface segment in a system, in which case different base clocks may be used for the different segments. For example, one component might implement both a 66 MHz base hub interface and a 100 MHz base hub interface.

Source Synchronous Transfer Mode Operation

In one embodiment, the packets/data are transmitted using a source synchronous clock mode, which provides a technique for multiplying the data transfer rate of data. For example, in an embodiment using 4× source synchronous clocking mode with an eight bit data signal path, transmitting a double-word (i.e., four byte) requires only one hub interface clock cycle (HLCK.) Alternatively, transmitting a double word using 1× source synchronous clocking mode on an eight bit data signal path would require a full hub interface clock cycle to complete.

More specifically, in one embodiment of source synchronous transmission, strobes (e.g., PSTRBN/PSTRBP) are sent with a data transmission in accordance with a predetermined timing relationship between the strobes and the data. The strobes are thereafter used by the receiving hub agent to latch the data into the receiving hub agent.

More specifically, in one embodiment, the edges of the strobes PSTRBP/PSTRBN are used by the receiving hub agent to identify the presence and timing of data being transferred across the data signal paths. For example, as illustrated in the timing diagram of FIG. 11, in one embodiment a first data transfer corresponds to the rising edge of PSTRBP and the falling edge of PSTRBN. A second data transfer corresponds to the rising edge of PSTRBN and the falling edge of PSTRBP.

Figure 11:
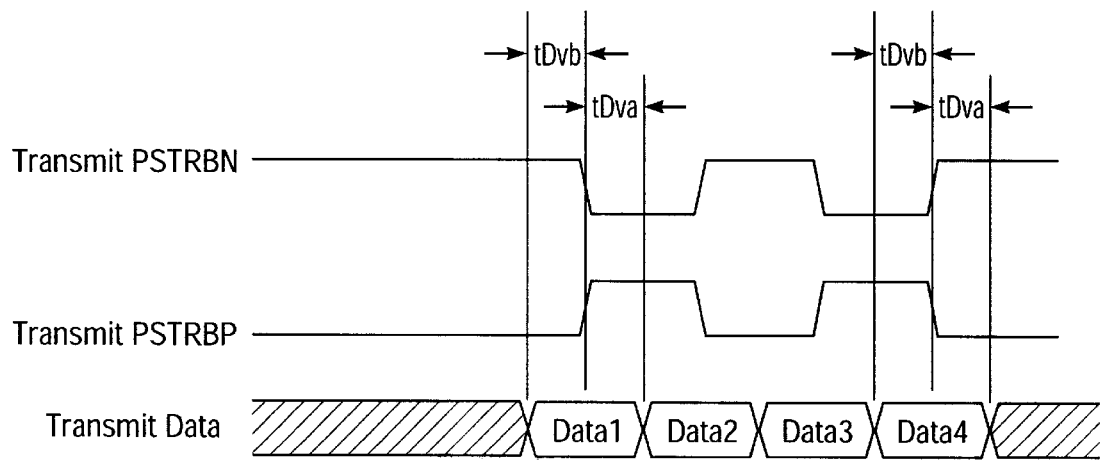
FIG. 11 is a timing diagram illustrating source synchronous clocking according to one embodiment.

In addition, in one embodiment, as further shown in FIG. 11, the transmit edges of the strobes PSTRBP/PSTRBN are positioned near the center of the data valid window. As a result, the receiving agent is given an input data sampling window to accommodate various system timing skews. Moreover, in one embodiment a minimum data valid before strobe edge (tDvb), and a minimum data valid after strobe edge (tDva) are also used by the receiving hub agent to identify and latch data being transmitted. Once the receiving hub agent latches the incoming data, the data is thereafter held for brief period to resynchronize the data with the hub interface clock (HLCK) before being passed along within the hub agent.

Figure 12:
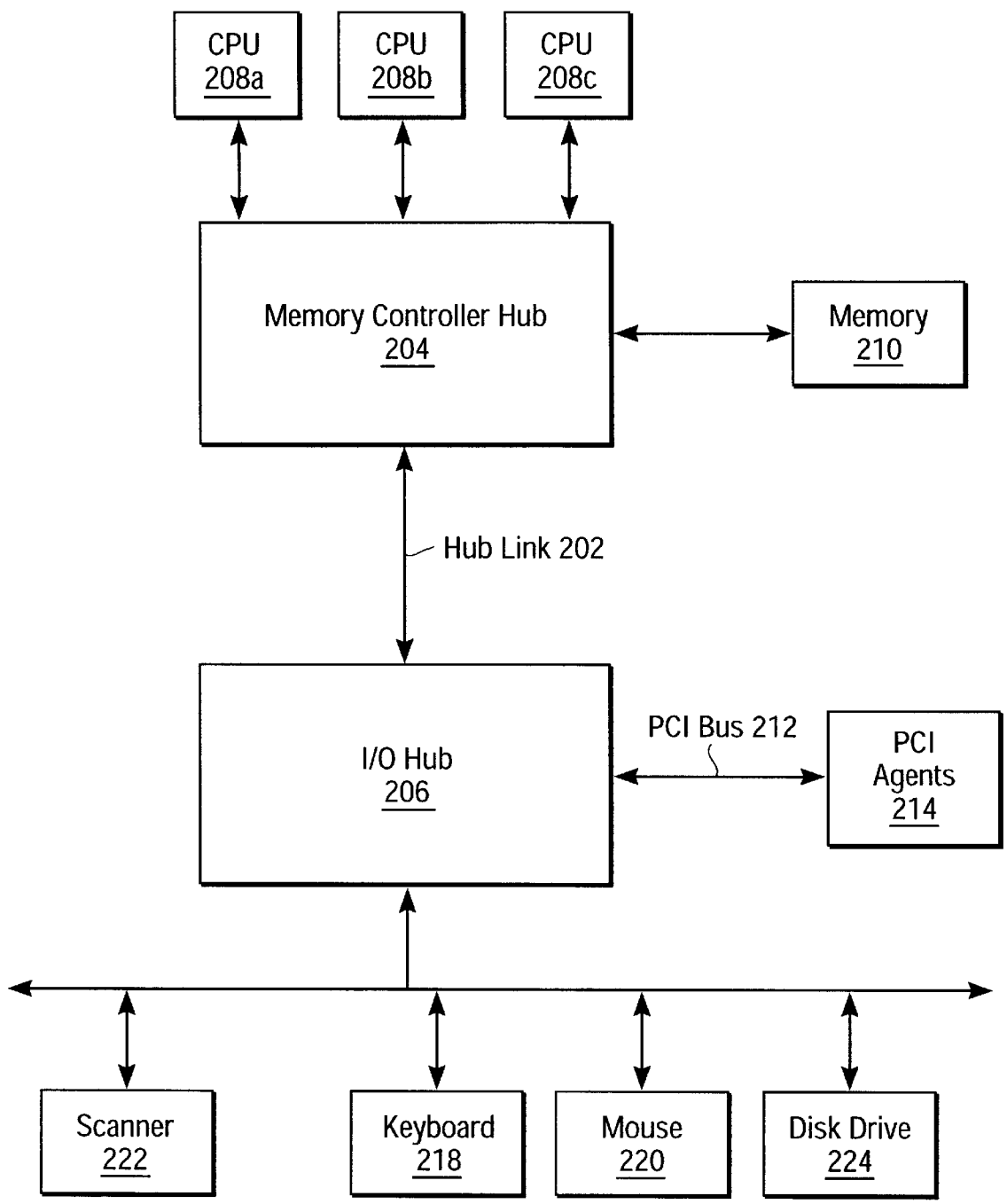
FIG. 12 illustrates a computer system having multiple processors implementing an improved interface between computer components according to one embodiment.

In the foregoing detailed description, the method and apparatus of the present invention has been described with reference to specific exemplary embodiments thereof. It will, however, be evident that various modifications and changes may be made thereto without departing from the broader spirit and scope of the present invention. For example, the hub interface, according to one embodiment, may be implemented in a computer system having multiple processors, as illustrated in FIG. 12. The present specification and figures are accordingly to be regarded as illustrative rather than restrictive.

What is claimed is:

1. A system comprising:
   a processor coupled to a processor bus;
   a memory control hub coupled to the processor bus, the control hub being an agent;
   a hub interface coupled to the control hub;
   an input-output hub coupled to the hub interface, the input-output hub capable of communicating with the control hub through the hub interface using packets, the input-output hub being an agent; and
   an input-output device coupled to the input-output hub.

2. The system of claim 1 wherein:
   the input-output hub constrained to request read transactions only when the input-output hub has available storage for data expected from the read transactions.

3. The method of claim 1 wherein:
   the memory control hub including storage sufficient to accept command and data corresponding to multiple outstanding read requests.

4. The system of claim 3 wherein:

the input-output hub constrained to request read transactions only when the input-output hub has available storage for data expected from the read transactions.

5. The system of claim 1 wherein:

the hub interface comprises an eight-bit hub interface and asynchronous memory writes are limited to 32 bytes per packet.

6. The system of claim 1 wherein:

the hub interface comprises a sixteen-bit hub interface and asynchronous memory writes are limited to 64 bytes per packet.

7. The system of claim 1 wherein:

the arbitration logic of the memory control hub and the input-output hub are implemented to give isochronous transactions over the hub interface priority over asynchronous transactions.

8. The system of claim 1 wherein:

the hub interface comprises an eight-bit hub interface and the memory control hub and the input-output hub limit packet sizes to 32 bytes in asynchronous transfers when an agent is requesting the hub interface, and to surrender the hub interface upon completion of a packet following receipt of a request for the hub interface.

9. The system of claim 1 wherein:

the hub interface comprises a sixteen-bit hub interface and the memory control hub and the input-output hub limit packet sizes to 64 bytes in asynchronous transfers when an agent is requesting the hub interface, and to surrender the hub interface upon completion of a packet following receipt of a request for the hub interface.

10. The system of claim 1 wherein:

the memory control hub including storage sufficient to accept commands and data corresponding to multiple outstanding read requests;

the input-output hub constrained to request read transactions only when the input-output hub has available storage for data expected from the read transactions;

the memory control hub and the input-output hub give isochronous transfers of data over the hub interface priority over asynchronous transfers;

the hub interface comprises an eight-bit hub interface; and the memory control hub and the input-output hub limit packet sizes to 32 bytes in asynchronous transfers when an agent is requesting the hub interface, and to surrender the hub interface upon completion of a packet following receipt of a request for the hub interface.

11. A method of transferring data between a memory control hub coupled to a hub interface which is coupled to an input-output hub comprising:

transferring the data in packets;

prioritizing isochronous transfers over asynchronous transfers;

limiting asynchronous transfers from a first agent to 32 bytes per packet when a second agent has a request for the hub interface pending; and limiting asynchronous transfers to 64 bytes per packet when no requests for the hub interface are pending.

12. The method of claim 11 further comprising:

originating read transactions from the input-output hub when the input-output hub has storage available for data expected to be returned from the read transactions.

13. The method of claim 12 wherein:

the memory control hub includes storage sufficient to accommodate data returning to the memory control hub as a result of multiple read requests, the data corresponding to the multiple read requests.

14. A method of transferring data between a memory control hub coupled to a hub interface which is coupled to an input-output hub comprising:

transferring the data in packets;

prioritizing isochronous transfers over asynchronous transfers;

limiting asynchronous transfers from a first agent to 64 bytes per packet when a second agent has a request for the hub interface pending; and limiting asynchronous transfers to 128 bytes per packet when no requests for the hub interface are pending;

originating read transactions from the input-output hub when the input-output hub has storage available for data expected to be returned from the read transactions; and wherein the memory control hub includes storage sufficient to accommodate data returning to the memory control hub as a result of multiple read requests, the data corresponding to the multiple read requests.

15. A system including a memory control hub coupled to a hub interface which is coupled to an input-output hub comprising:

means for transferring the data in packets;

means for prioritizing isochronous transfers over asynchronous transfers;

means for limiting asynchronous transfers from a first agent to 32 bytes per packet when a second agent has a request for the hub interface pending; and means for limiting asynchronous transfers to 64 bytes per packet when no requests for the hub interface are pending.

16. The system of claim 15 further comprising:

originating read transactions from the input-output hub when the input-output hub has storage available for data expected to be returned from the read transactions.

17. The system of claim 16 wherein:

the memory control hub includes storage sufficient to accommodate data returning to the memory control hub as a result of multiple read requests, the data corresponding to the multiple read requests.

18. A chipset comprising:

a memory control hub capable of being coupled to a processor bus, the processor bus capable of being coupled to a processor, the memory control hub being an agent;

a hub interface coupled to the memory control hub; and an input-output hub coupled to the hub interface, the input-output hub capable of communicating with the control hub through the hub interface using packets, the input-output hub being an agent, the input-output hub capable of being coupled to an input-output device.

19. A system including a memory control hub coupled to a hub interface which is coupled to an input-output hub comprising:

means for transferring the data in packets;

means for prioritizing isochronous transfers over asynchronous transfers;

means for limiting asynchronous transfers from a first agent to 64 bytes per packet when a second agent has a request for the hub interface pending; and means for limiting asynchronous transfers to 128 bytes per packet when no requests for the hub interface are pending;

means for originating read transactions from the input-output hub when the input-output hub has storage available for data expected to be returned from the read transactions; and wherein the memory control hub includes storage sufficient to accommodate data returning to the memory control hub as a result of multiple read requests, the data corresponding to the multiple read requests.

* * * * *